(12) United States Patent
Saito

(10) Patent No.: US 9,002,366 B2
(45) Date of Patent: Apr. 7, 2015

(54) WIRELESS COMMUNICATION APPARATUS

(75) Inventor: Noriaki Saito, Tokyo (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 13/814,202

(22) PCT Filed: Jan. 31, 2012

(86) PCT No.: PCT/JP2012/000645
§ 371 (c)(1),
(2), (4) Date: Feb. 4, 2013

(87) PCT Pub. No.: WO2012/132184
PCT Pub. Date: Oct. 4, 2012

(65) Prior Publication Data
US 2013/0130740 A1 May 23, 2013

(30) Foreign Application Priority Data
Mar. 28, 2011 (JP) ................................. 2011-070512

(51) Int. Cl.
*H04W 72/08* (2009.01)
*H04W 72/04* (2009.01)
*H04W 88/06* (2009.01)
*H04W 36/30* (2009.01)

(52) U.S. Cl.
CPC .............. *H04W 88/06* (2013.01); *H04W 36/30* (2013.01)

(58) Field of Classification Search
USPC ............ 455/552.1, 67.11, 509, 452.2, 67.13, 455/452.1, 550.1, 63.1, 501
See application file for complete search history.

(56) References Cited

U.S. PATENT DOCUMENTS

| 8,711,762 B2* | 4/2014 | Murakami et al. ............ 370/319 |
| 8,797,970 B2* | 8/2014 | Xing et al. .................... 370/329 |
| 2007/0201503 A1* | 8/2007 | Nishio .......................... 370/437 |
| 2011/0179330 A1* | 7/2011 | Matsumoto ................... 714/748 |
| 2012/0224851 A1* | 9/2012 | Takara et al. ................... 398/45 |

FOREIGN PATENT DOCUMENTS

| JP | 2003-032752 A | 1/2003 |
| JP | 2004-112225 A | 4/2004 |
| JP | 2010-118774 A | 5/2010 |

OTHER PUBLICATIONS

International Search Report, mailed Mar. 13, 2012, for International Application No. PCT/JP2012/000645, 2 pages.

\* cited by examiner

*Primary Examiner* — John J Lee
(74) *Attorney, Agent, or Firm* — Seed IP Law Group PLLC

(57) ABSTRACT

A wireless communication apparatus compatible with a plurality of communication schemes includes a first communicator that performs a communication in a first communication scheme, a second communicator that performs a communication in a second communication scheme, a signal generator that generates a signal for commanding startup of a communicator of the wireless communication terminal which performs a communication in the second communication scheme when the reception quality in the first communication scheme is equal to or higher than a threshold value, provided that the first communicator is in a state of communicable with the wireless communication terminal and that the communicator of the wireless communication terminal is not started, and a threshold value setting section that sets the threshold value based on information indicating the reception qualities in the first and second communication schemes.

5 Claims, 6 Drawing Sheets

WIRELESS COMMUNICATION APPARATUS

TECHNICAL FIELD

The present invention relates to a wireless communication apparatus having a plurality of communication modules compatible with different frequency bands.

BACKGROUND ART

A communication terminal that is compatible with WLAN (Wireless Local Area Network) wireless communication employed in high speed data communication is required to smoothly perform WLAN wireless communication after the communication terminal has entered a WLAN communication area.

For this reason, even when the communication terminal is in an area where it is difficult to carry out WLAN wireless communication (a WLAN communication-disabled area), power of a chip or a module used for carrying out WLAN wireless communication must be left on. This is one of factors that pose difficulty in diminishing power consumed by the communication terminal.

In recent years there is an increasing number of cases where a communication terminal compatible with WLAN wireless communication is equipped with a Bluetooth (registered trademark) wireless system used for a link, with peripheral devices, including a wireless headphone, a keyboard, and a mouse. Bluetooth wireless communication generally involves consumption of a smaller amount of current when compared with WLAN wireless communication.

When the communication terminal is in the WLAN communication-disabled area, the power consumed by the communication terminal can be reduced, so long as the communication terminal stays on standby in the Bluetooth wireless system while the power of the chip or the module for WLAN wireless communication is turned off.

Although a method for switching between the wireless communication systems is not specifically mentioned, Patent Literature 1 discloses employing an appropriate wireless communication system from one use to another.

FIG. 6 is a diagram showing communication between related-art heterogeneous communication devices compatible with both WLAN wireless communication and Bluetooth wireless communication. As shown in FIG. 6, heterogeneous communication devices 501 and 506, having a relation one acting as a mobile station and the other acting as a base station, each include a communication interface compatible with WLAN wireless communication and another communication interface compatible with Bluetooth wireless communication.

The heterogeneous communication devices 501 and 506 use the appropriate communication interfaces from one use to another, thereby curbing the power consumed by the WLAN wireless communication interface and performing communication, as necessary, while assuring a rate WLAN communication.

Patent Literature 2 discloses a wireless terminal having a millimeter-wave transceiver and a microwave transceiver. According to the descriptions of Patent Literature 2, the term "millimeter wave" means electromagnetic waves in a frequency band of 30 GHz or more and less than 300 GHz. The millimeter-wave transceiver is an electromagnetic wave transceiver circuit using: for instance, 57 to 66 GHz bands.

In the meantime, the microwave means electromagnetic waves having a frequency band of 300 MHz or more and less than 30 GHz. The microwave transceiver is an electromagnetic wave transceiver circuit using; for instance, a 5 GHz band or a 2.4 GHz band. The wireless terminal stores as a correlation table correlation information about wireless links between a millimeter wave and a microwave which have different frequency bands. Based on received electric field intensity (RSSI) acquired during microwave communication, a determination is made as to whether or not millimeter-wave communication is enabled.

CITATION LIST

Patent Literature

Patent Literature 1: JP-A-2004-112225
Patent Literature 2: JP-A-2010-118774

SUMMARY OF INVENTION

Technical Problem

Since commonality exists between some frequency bands used in WLAN and the Bluetooth frequency band, the correlation information utilized in Patent Literature 2 is of utility value. However, a frequency band employed in WLAN differs from that employed in WiGig, and information about a correlation between different frequency bands exhibits a low degree of accuracy. For this reason, it is often difficult to establish an efficient link between communication modules using different frequency hands. As a consequence, it is difficult to satisfy both of maximizing a communication-enabled area and reducing power consumed in a wait mode.

An object of the present invention is to provide a wireless communication apparatus whose plural communication modules compatible with different frequency bands can efficiently establish a link according to their respective reception statuses.

Solution to Problem

The present invention provides a wireless communication apparatus to be included in a wireless communication system in which a mobile wireless communication terminal and the wireless communication apparatus that is capable of communication with the wireless communication terminal each have a plurality of communication modules compatible with different communication schemes, the wireless communication apparatus including: a first communicator that performs a communication in a first communication scheme; a first reception quality measurement section that measures a reception quality of the first communicator; a second communicator that performs, in a second communication scheme, a high speed communication which is faster than that is performed under the first communication scheme; a second reception quality measurement section that measures a reception quality of the second communicator; a signal generator that generates a signal for commanding startup of a communicator of the wireless communication terminal which performs a communication in the second communication scheme when the reception quality measured by the first reception quality measurement section is equal to or higher than a threshold value, provided that the first communicator is in a state of communicable with the wireless communication terminal and that the communicator of the wireless communication terminal is not started; and a threshold value setting section that sets the threshold value based on information indicating the reception quality measured by the first reception quality measurement section and the reception quality measured by the second reception quality measurement section, provided that the first communicator and the second communicator are in a state of communicable with the wireless communication terminal, wherein the first communicator transmits the signal generated by the signal generator to the wireless communication terminal.

Advantageous Effects of Invention

In the wireless communication apparatus according to the present invention, the plurality of communication modules compatible with different frequency bands can efficiently establish a link according to their respective reception statuses.

MODES FOR CARRYING OUT INVENTION

An embodiment of the present invention is hereunder described by reference to the drawings.

Figure 1:
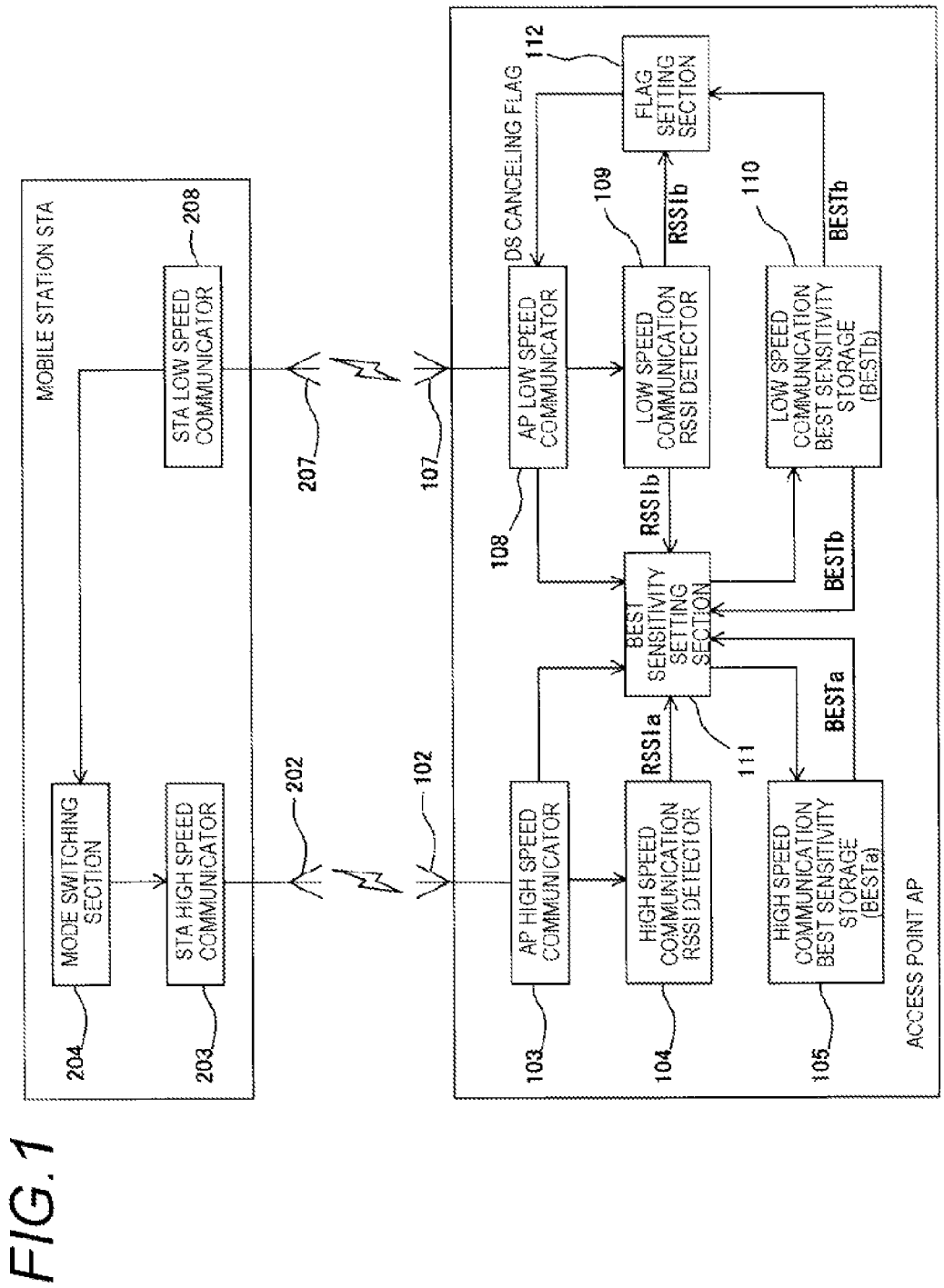
FIG. 1 is a block diagram showing a heterogeneous wireless communication system according to an embodiment.

FIG. 1 is a block diagram showing a heterogeneous wireless communication system according to an embodiment. As shown in FIG. 1, the heterogeneous wireless communication system according to the embodiment includes an access point AP and a mobile, station STA that are compatible with high speed communication including WiGig and low speed communication including WLAN.

A frequency band employed in high speed communication may also differ from a frequency band employed in low speed communication. Moreover, a combination of high speed communication with low speed communication is not limited to a specific combination. Specifically, any combinations come into effect, so long as the combinations each include high speed communication that exhibits a high transmission rate, involves large power consumption, and provides a narrow communication-enabled area with low speed communication that exhibits a low transmission rate, involves low power consumption, and provides a wide communication-enabled area.

The access point AP includes a high speed communication antenna 102, an AP high speed communicator 103, a high speed communication RSSI detector 104, a high speed communication best sensitivity storage 105, a low speed communication antenna 107, an AP low speed communicator 108, a low speed communication RSSI detector 109, a low speed communication best sensitivity storage 110, a best sensitivity setting section 111, and a flag setting section 112.

The mobile station STA includes a high speed communication antenna 202, an STA high speed communicator 203, a low speed communication antenna 207, an STA low speed communicator 208, and a mode switching section 204.

Respective constituent elements of the access point AP are hereunder described.

The AP high speed communicator 103 performs communication with the STA high speed communicator 203 of the mobile station STA in accordance with a high speed communication scheme. The high speed communication RSSI detector 104 measures received electric field intensity RSSIa of a signal sent from the STA high speed communicator 203.

The high speed communication best sensitivity storage 105 stores as best sensitivity BESTa a value of best sensitivity among the received electric field intensities RSSIa measured by the high speed communication RSSI detector 104 in the past.

The high speed communication best sensitivity storage 105 stores as an initial value for the best sensitivity BESTa, a value of standard sensitivity acquired under the high speed communication scheme defined by specifications.

The AP low speed communicator 108 performs communication with the STA low speed communicator 208 of the mobile station STA according to a low speed communication scheme. The AP low speed communicator 108 transmits a deep-sleep canceling flag set by the flag setting section 112 to the STA low speed communicator 208. The deep-sleep canceling flag can also be arranged in a header or a data segment of a transmission signal.

The low speed communication RSSI detector 109 measures received electric field intensity RSSIb of a signal transmitted from the STA low speed communicator 208. The low speed communication best sensitivity storage 110 stores as a threshold value to be utilized by the flag setting section 112 the best sensitivity BESTb that is determined from the received electric field intensity RSSIb, the received electric field intensity RSSIa, and the best sensitivity BESTa measured by the tow speed communication RSSI detector 109.

The low speed communication best sensitivity storage 110 stores as an initial value for the best sensitivity BESTb, a value of standard sensitivity acquired under the low speed communication scheme defined by specifications.

The best sensitivity setting section 111 sets the best sensitivity BESTa stored in the high speed communication best sensitivity storage 105 and the best sensitivity BESTb stored in the low speed communication best sensitivity storage 110. Details of operation of the best sensitivity setting section 111 will be described later. The flag setting section 112 sets the deep-sleep canceling flag to be transmitted to the mobile station STA. Details of operation of the flag setting section 112 will also be described later.

Respective constituent elements of the mobile station STA are now described.

The STA high speed communicator 203 performs communication with the AP high speed communicator 103 of the access point AP according to the high speed communication scheme. The STA low speed communicator 208 performs communication with the AP low speed communicator 108 of the access point AP according to the low speed communication scheme.

The mode switching section 204 switches an operation mode of the STA high speed communicator 203 according to the deep-sleep canceling flag received by the STA low speed communicator 208. Specifically, the mode switching section 204 switches the STA high speed communicator 203 between the deep-sleep mode and a normal operation mode.

When the STA high speed communicator 203 is in the deep-sleep mode, high speed operation is not necessary. Therefore, power consumed by the STA high speed communicator 203 can be curtailed.

Figure 2:
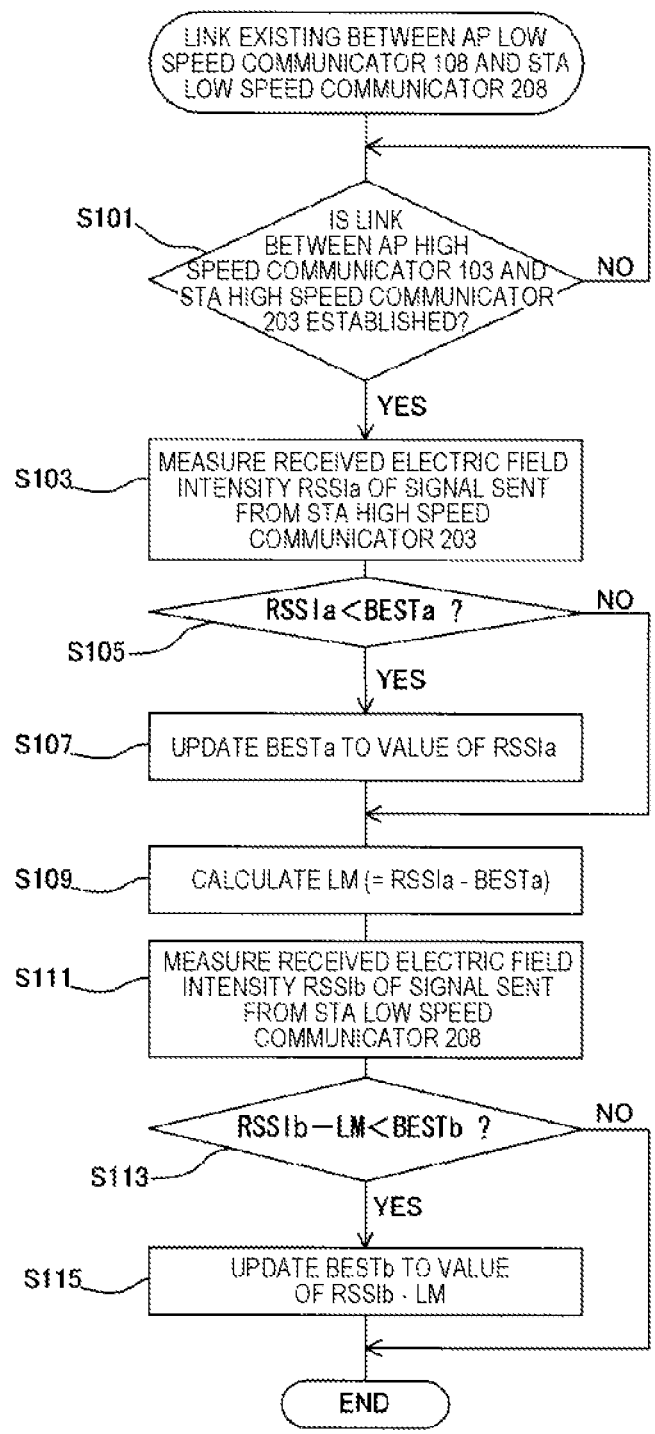
FIG. 2 is a flowchart, showing procedures for updating the best sensitivity BESTb of low-speed communication acquired at an access point AP.

Operations of the best sensitivity setting section 111 of the access point AP are hereunder described in detail. FIG. 2 is a flowchart, showing procedures for updating the best sensitivity BESTb of low speed communication acquired at the access point AP.

As shown in FIG. 2, when a link between the AP low speed communicator 108 and the STA low speed communicator 208 is established, the best sensitivity setting section 111 determines whether or not a link between the AP high speed communicator 103 and the STA high speed communicator 203 is established (step S101). When the link is determined to be established, processing proceeds to step S103.

In step S103, the high speed communication RSSI detector 104 measures the received electric field intensity RSSIa of the signal sent from the STA high speed communicator 203 and outputs the thus-measured received electric field intensity RSSIa to the best sensitivity setting section 111.

The best sensitivity setting section 111 determines whether or not the received electric field intensity RSSIa is smaller than the best sensitivity BESTa stored in the high speed communication best sensitivity storage 105<BESTa) (step S105). When a determination result satisfies RSSIa<BESTa, processing proceeds to step S107. In contrast, when the determination result satisfies RSSIa>BESTa, processing proceeds to step S109.

In step S107, the best sensitivity setting section 111 stores the received electric field intensity RSSIa measured in step S103 as the best sensitivity BESTa in the high speed communication best sensitivity storage 105. Specifically, the best sensitivity BESTa stored in the high speed communication best sensitivity storage 105 is updated to a value of the received electric field intensity RSSIa measured in step S103.

In step S109, the best sensitivity setting section 111 calculates a difference (RSSIa−BESTa) between the received electric field intensity RSSIa measured in step S103 and the best sensitivity BESTa as a link margin LM. When the best sensitivity BESTa is updated by the received electric field intensity RSSIa in step S107, LM naturally assumes a value of zero.

Next, the low speed communication RSSI detector 109 measures the received electric field intensity RSSIb of a signal sent from the STA low speed communicator 208 (step S111).

The best sensitivity setting section 11 then determines whether or not a value (RSSIb−LM) which is determined by subtracting the link margin LM from the received electric field intensity RSSIb is smaller than the best sensitivity BESTb stored in the low speed communication best storage 110 (RSSIb−LM<BESTb) (step S113).

When a determination result satisfies RSSIb−LM<BESTb, processing proceeds to step S115. In contrast, the determination result satisfies RSSIb−LM=BESTb, processing for updating the best sensitivity BESTb ends.

In step S115, the best sensitivity setting section 111 stores a value (RSSIb−LM) which is determined, by subtracting the link margin LM from the received electric field intensity RSSIb as the best sensitivity BESTb in the low speed communication best sensitivity storage 110. Specifically, the best sensitivity BESTb stored in the low speed communication best sensitivity storage 110 is updated to a value of RSSIb−LM.

Figure 3:
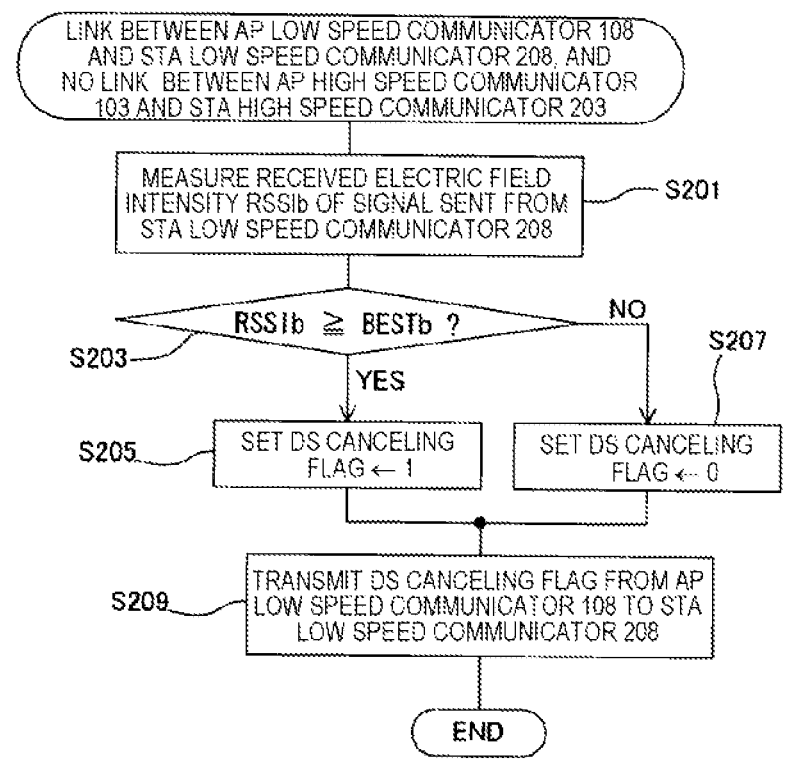
FIG. 3 is a flowchart showing procedures for canceling deep-sleep of high-speed communication using the best sensitivity BESTb of the low-speed communication acquired at the access point AP.

Operation of the flag setting section 112 of the access point AP is hereunder described in detail. FIG. 3 is a flowchart showing procedures for canceling a deep-sleep of high speed communication using the best sensitivity BESTb of low speed communication acquired at the access point AP.

A link between the AP low speed communicator 108 and the STA low speed communicator 208 is established as shown in FIG. 3. When the AP high speed communicator 103 and the STA high speed communicator 203 are not yet linked to each other, processing pertaining to the following steps is performed.

The low speed communication RSSI detector 109 measures received electric field intensity RSSIb of a signal sent from the STA low speed communicator 208 (step S201).

Next, the flag setting section 112 determines whether or not the received electric field intensity RSSIb is equal to or greater than the best sensitivity BESTb stored in the low speed communication best sensitivity storage 110 (RSSIb=BESTb) (step S203).

When a determination result is RSSIb=BESTb, processing proceeds to step S205. In contrast, the determination result is RSSIb<BESTb, processing proceeds to step S207.

In step S205, the flag setting section 112 sets the deep-sleep canceling flag that shows whether or not the mobile station STA cancels the deep-sleep mode of the STA high speed communicator 203 (a IDS canceling flag←1).

In the meantime, in step S207, the flag setting section 112 does not set the deep-sleep canceling flag (the DS canceling flag←0).

After step S205 or S207, the AP low speed communicator 108 transmits the deep-sleep canceling flag to the STA low speed communicator 208 (step S209).

Figure 4:
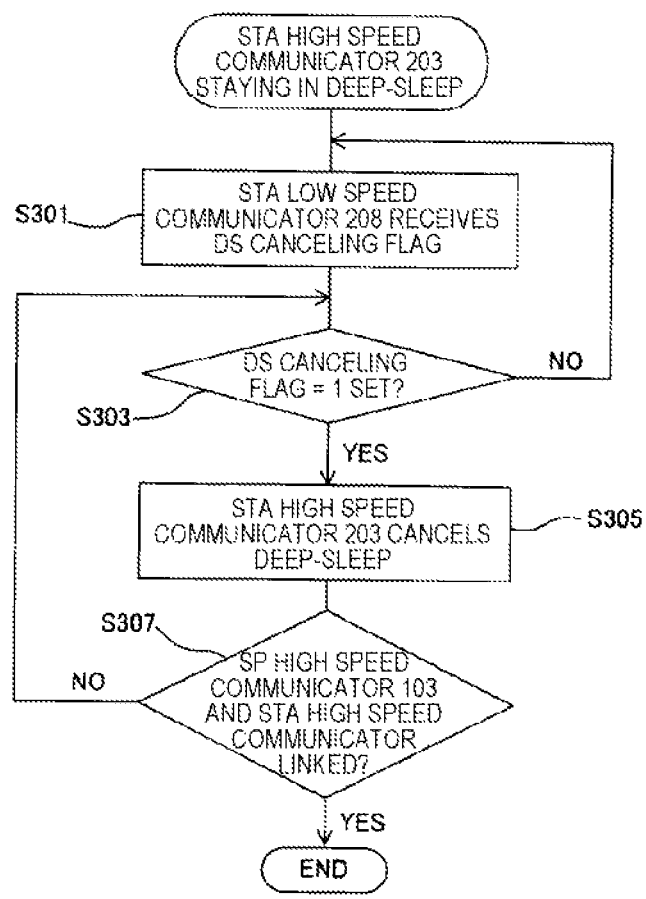
FIG. 4 is a flowchart showing procedures for canceling deep-sleep of high-speed communication using the best sensitivity BESTb of the low-speed communication acquired at a mobile station STA.

Operation of the mode switching section 204 of the mobile station STA is hereunder described in detail. FIG. 4 is a flowchart showing procedures for canceling deep-sleep of high speed communication using the best sensitivity BESTb of low speed communication acquired at the mobile station STA.

As shown in FIG. 4, the STA low speed communicator 208 receives the deep-sleep canceling flag (step S301).

Next, the mode switching section 204 determines whether or not the deep-sleep canceling flag is set (the DS canceling flag=1) (step S303). When a determination result satisfies DS canceling flag=1, processing proceeds to step S305. In contrast, when the determination result satisifies DS canceling flag=0, processing returns to step S301.

In step S305, the mode switching section 204 cancels the deep-sleep mode of the STA high speed communicator 203. After step S305, the mode switching section 204 determines whether or not the link between the STA high speed communicator 203 and the AP high speed communicator 103 is established (step S307). When the link is determined to be established, cancel processing ends. In contrast, when the link is determined not to be established, processing returns to step S301.

As mentioned above, according to the embodiment, the following is performed during setting of the best sensitivity BESTb that is a threshold value to be compared with the received electric field intensity RSSIb of low speed communication at the time of determination of the status of the deep-sleep canceling flag. Specifically, provided that a value (RSSIb−LM) derived by subtraction of the link margin LM (=RSSIa−BESTa), being a difference between the received electric field intensity RSSIa of high speed communication and the best sensitivity BESTa of high speed communication, from the received electric field intensity RSSIb is smaller than the existing best sensitivity BESTb (RSSIb−LM<BESTb), the best sensitivity BESTb is updated to a value of (RSSIb−LM).

The threshold value used for canceling the deep-sleep mode of the STA high speed communicator 203 at the mobile station STA is updated at all times according to both the best sensitivity BESTa of high speed communication and the best sensitivity BESTb of low speed communication and the current received electric field intensity RSSIa of high speed communication.

As a consequence, even when a difference exists between the frequency band employed for high speed communication and the frequency band employed fir low speed communication, an efficient link can be established according to respective reception statuses of high speed communication and low speed communication.

Figure 5:
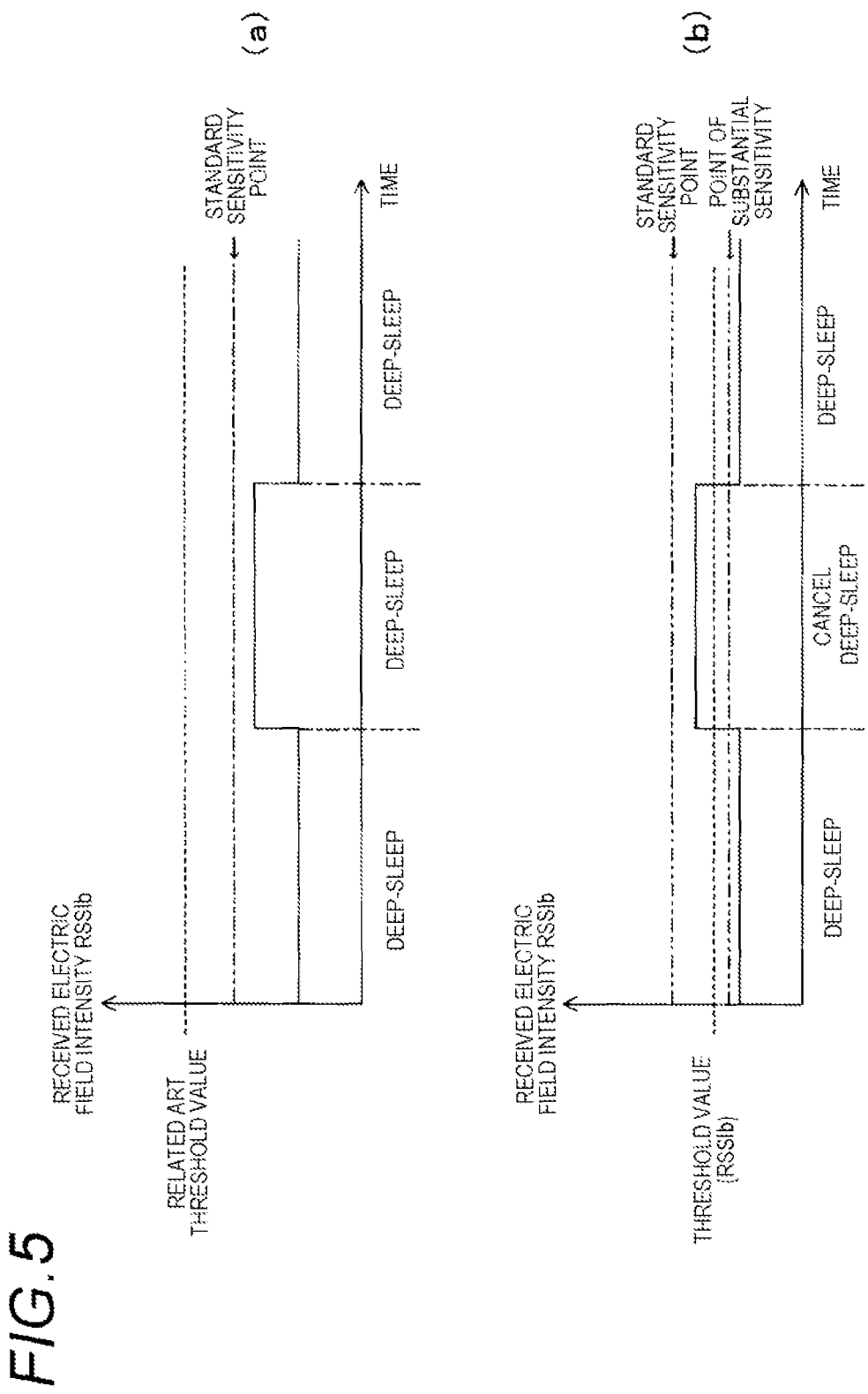
FIG. 5 is graphs showing time changes in received electric field intensity RSSIb and whether or not an STA high-speed communicator 203 of the mobile station is in a deep-sleep mode, in which (a) shows those acquired in the related art and (b) shows those acquired in the embodiment: of the present invention.
Figure 6:
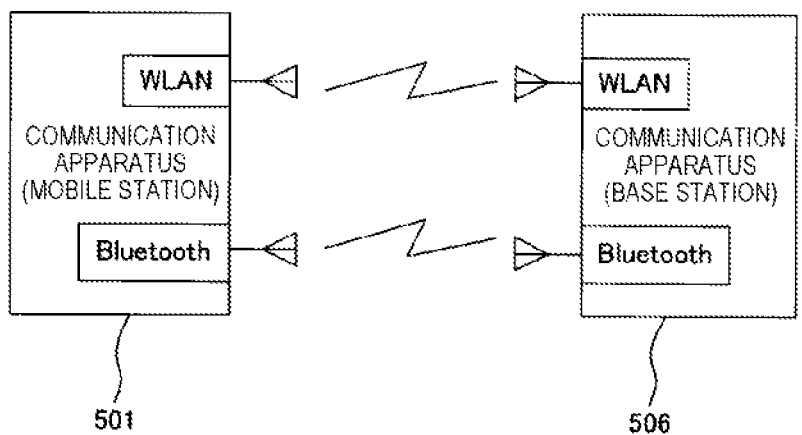
FIG. 6 is a diagram showing communication between related-art heterogeneous communication devices that are compatible with both WLAN wireless communication and Bluetooth wireless communication.

FIG. 5 corresponds to graphs showing time changes in received electric field intensity RSSIb and whether or not the STA high-speed communicator 203 of the mobile station is in a deep-sleep mode, wherein (a) shows those acquired in the related art and (b) shows those acquired in the embodiment of the invention. As shown in FIG. 5(a), in the related art, there is a high threshold value that is set based on correlation with low speed communication and used for determining whether to cancel the deep-sleep mode of high speed communication. Therefore, even in a case where high speed communication is enabled, the high speed communication module sometimes keeps staying in a deep-sleep mode.

However, as shown in FIG. 5(b), when the value of the deep-sleep canceling flag is set in the embodiment, the link margin LM for high speed communication is subtracted from the threshold value (BESTb) that is compared with the received electric field intensity RSSIb. Hence, the threshold value lowers to a neighborhood of a point of substantial sensitivity, so that the threshold value, is lower than its counterpart described in connection with the related art shown in FIG. 5(a).

Therefore, the deep-sleep mode of the high speed communication module, which is not canceled in the related art, is canceled in the embodiment. Thus, both maximizing the communication-enabled area and reducing power consumed in standby mode can be accomplished.

Although the embodiment has been descried with reference to, as an example, the case where one mobile station STA is linked to the access point. AP, there is also adopted a case where a plurality of mobile stations STA are linked to the access point AP. However, a difference often exists among mobile stations in terms of a value of substantial received sensitivity. Therefore, the access point AP can also perform processing for each mobile station by utilization of a MAC address held in each of the mobile stations.

Moreover, the access point AP can also perform processing based on reception quality, such as SNR, in place of RSSI.

Although the present invention has been described in detail with reference to the specific embodiment, it is manifest to those skilled in the art that the invention is susceptible to various alterations or modifications without departing the spirit and scope of the present invention.

The present application is based on Japanese Patent Application (2011-070512) filed on Mar. 28, 2011, the contents of which are incorporated herein by reference.

INDUSTRIAL APPLICABILITY

The wireless communication apparatus according to the present invention is useful as a wireless communication apparatus having a plurality of communication modules compatible with different frequency bands.

REFERENCE SIGNS LIST

AP: Access Point
STA: Mobile Station
102: High Speed Communication Antenna
103: AP High Speed Communicator
104: High Speed Communication RSSI Detector
105: High Speed Communication Best Sensitivity Storage
107: Low Speed Communication Antenna
108: AP Low Speed Communicator
109: Low Speed Communication Rssi Detector
110: Low Speed Communication Best Sensitivity Storage
111: Best Sensitivity: Setting Section
112: Flag Setting Section
202: High Speed Communication Antenna
203: STA High Speed Communicator
204: Mode Switching Section
207: Lows Peed Communication Antenna
208: STA Low Speed Communicator

The invention claimed is:

1. A wireless communication apparatus to be included in a wireless communication system in which a mobile wireless communication terminal and the wireless communication apparatus are included, the wireless communication apparatus and the mobile wireless communication terminal each have a plurality of communication modules compatible with different communication schemes, the wireless communication apparatus comprising:
    a first communicator that performs a communication in a first communication scheme;
    a first reception quality measurement section that measures a reception quality of the first communicator;
    a second communicator that performs, in a second communication scheme, a high speed communication which is faster than that performed under the first communication scheme;
    a second reception quality measurement section that measures a reception quality of the second communicator;
    a signal generator that generates a signal for commanding startup of a communicator of the mobile wireless communication terminal which performs a communication in the second communication scheme when a reception quality measured by the first reception quality measurement section is equal to or higher than a threshold value, provided that the first communicator is in a linked state with the mobile wireless communication terminal and that the communicator of the mobile wireless communication terminal is not started; and
    a threshold value setting section that sets the threshold value based on information indicating the reception quality measured by the first reception quality measurement section and a reception quality measured by the second reception quality measurement section, provided that the first communicator and the second communicator are in a linked state with the mobile wireless communication terminal, wherein
    the first communicator transmits the signal generated by the signal generator to the mobile wireless communication terminal.

2. The wireless communication apparatus according to claim 1, wherein
    the threshold value setting section resets the threshold value based on a value of a current reception quality measured by the first reception quality measurement section, a value of best quality among past reception qualities measured by the first reception quality measurement section, a link margin set in accordance with a magnitude relation between the two values, a value of a current reception quality measured by the second reception quality measurement section, and a latest threshold value set by the threshold value setting section.

3. The wireless communication apparatus according to claim 2, wherein
when a difference that is obtained by subtracting the link margin from the value of the current reception quality measured by the second reception quality measurement section is smaller than the latest threshold value set by the threshold value setting section, the threshold value setting section resets the difference newly as the threshold value.

4. The wireless communication apparatus according to claim 2, comprising
a storage that stores the threshold value and a value of a best reception quality among past reception qualities measured by the first reception quality measurement section.

5. The wireless communication apparatus according to claim 1, wherein
when a plurality of mobile wireless communication terminals are capable of communicating with the wireless communication apparatus, the wireless communication apparatus performs operations for each of the mobile wireless communication terminals based on identification information assigned to each of the mobile wireless communication terminals.

* * * * *